April 21, 1931.    K. J. WERSÄLL    1,801,471
CENTRIFUGAL FRICTION CLUTCH
Filed April 23, 1927
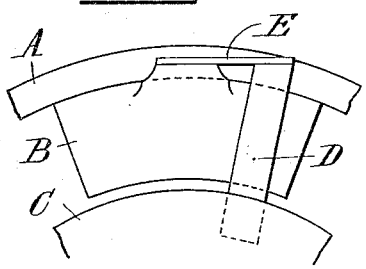
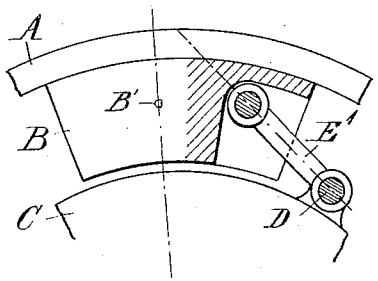
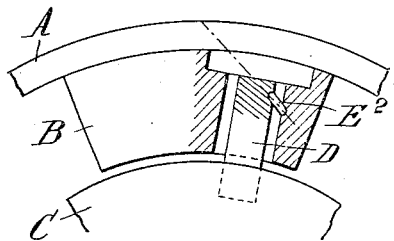
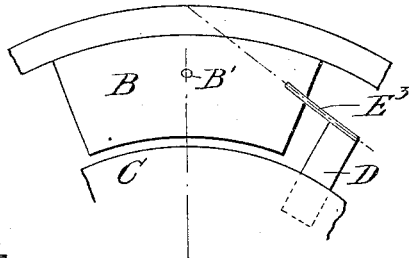
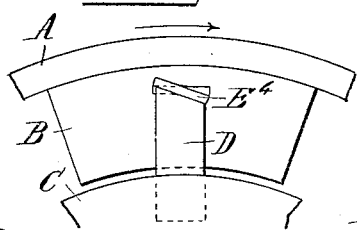
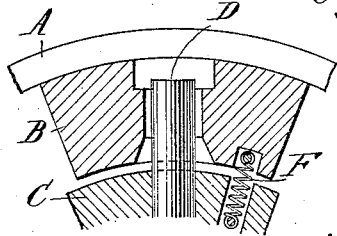
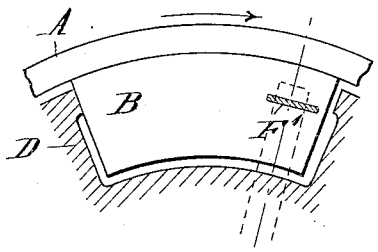
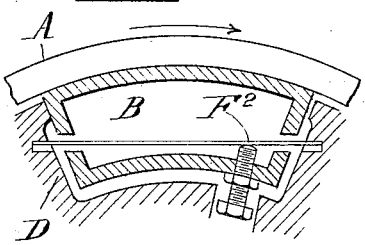
Karl Johan Wersäll
INVENTOR
his ATTY.

Patented Apr. 21, 1931

1,801,471

UNITED STATES PATENT OFFICE

KARL JOHAN WERSÄLL, OF STOCKHOLM, SWEDEN, ASSIGNOR TO AMERICAN KAMBI COMPANY, OF NEW YORK, N. Y., A CORPORATION OF DELAWARE

CENTRIFUGAL FRICTION CLUTCH

Application filed April 23, 1927, Serial No. 185,962, and in Germany January 31, 1927.

This invention relates to a centrifugal friction clutch in which the centrifugal friction-bodies or shoes are actuated through the medium of a driver. To increase the wearing resistance of the clutch it is very important that the maximal unit pressure in the friction surface should be reduced to a minimum. In all known prior constructions of clutches the surface pressure is considerably greater at one end of the shoe, generally at the front end of the same, on account of the turning moment resulting from the driving power and the friction power tending to press the front end of the shoe with greater pressure against the track, than the rear end.

According to the present invention the required pressure distribution is obtained by insuring a turning moment of the shoe in the opposite direction tending to lighten the pressure of the shoe at the front end. This can be done by a link or spring construction giving a down pull on the front end of the shoe, or by having a spring exert the desired torsion, or by placing the link or spring in such a way, that it gives a turning moment in the opposite direction, i. e. tending to lighten the pressure at the front end of the shoe.

The accompanying drawings illustrate the invention. In these drawings:—

Fig. 1 is a side view of a clutch with one form of a spring or link connection between the shoe and the driver, so arranged as to give a turning moment between the driving power and the friction power in the right direction.

Fig. 2 is a sectional side view of a clutch of another form of link connection giving a downward pull on the front end of the shoe.

Fig. 3 is a sectional side view of a clutch showing a pin connection between the driver and the shoe giving a downward pressure on the front end of the shoe.

Fig. 4 is a side view of a clutch with a different form of spring connection between the driver and the shoe giving a downward pull on the front end of the shoe.

Fig. 5 is a side view of a clutch with another form of spring connection between the driver and the shoe, the spring working under torsion, so as to give the desired movement.

Fig. 6 is a sectional side view of a clutch with a spring so arranged as to lighten the pressure of the front end of the shoe.

Fig. 7 is a side view similar to Fig. 6, but with a flat spring fixed in the clutch shoe, the end of which rests against the driver in such a way as to give a downward pressure to the front end of the shoe.

Fig. 8 is a sectional side view of a spring controlled clutch, the connection between the shoe and the spring being placed nearer the front end of the shoe, so that the pressure of the same against the track will be less at the front end.

The spring E, Fig. 1, is connected to the driver D which is fixed in the hub C, and the friction shoe B is so arranged that the driving power on the shoe B is applied outside of the friction track A, so that the turning moment which occurs between the driving power and the friction power tends to lessen the pressure against the track of the front end of the shoe in the direction of the movement. In this form the shoe has a laterally-projecting portion for engagement with the spring, while the driver, in the form of a radially-located pin D, carried by the hub C, is also located laterally of the shoe and the friction surface or track A, the action of the driver being to pull the shoe toward the right in Fig. 1.

In Figs. 2 and 4 the down pull on the front end of the shoe is obtained respectively through the link $E^1$ and the spring $E^3$ connecting the driver D and the shoe B, the link $E^1$ or Spring $E^3$ being so arranged, that the direction of the driving power cuts an axial plane through the centre of gravity $B^1$ of the body B in or outside of the friction track A.

In Fig. 3 the connection between the driver D and the shoe B is arranged in such a way, that a pin, disc or the like $E^2$ is inserted between the driver D and the shoe B in such a direction that on the rotation of the clutch to drive the shoe B forward on the track A, this pin or disc $E^2$ also has a tendency to press the front end of the shoe B toward the centre of the clutch.

In Fig. 5, the driver D is placed on one or both sides of the shoe B, and is so arranged, that the spring $E^4$ connecting the driver D and the shoe B, through torsion tends to relieve the pressure on the front end of the shoe.

In Figs. 6, 7 and 8 the down pressure at the front end of the shoe is obtained by the springs F, F¹ or F², the spring power of which is adjusted and applied in such a way as to give the desired adjustment of the pressure along the contact surface of the shoe against the track. Should a loose or protruding particle be present on the friction track and the centrifugal body or shoe slide onto it, said centrifugal body could position itself relatively to the track much more easily and glide over such particle when the foremost end of the body presses more lightly against the track than does the rear end thereof, and the track will wear much better than is the case with known constructions in which no provision is made for reducing the frictional contact pressure at the leading end of the centrifugal body or shoe.

Having now particularly described and ascertained the nature of my said invention and in what manner the same is to be performed, I declare that what I claim is:

1. In a centrifugal friction clutch, the combination of a driven member, a driver and a shoe, said shoe and driver having therebetween flexible connecting means located in the direction of the tangential force exerted on the shoe by the driver and so located as to lessen the contact pressure of the shoe on the driven member at the front end of the shoe in the direction of movement thereof.

2. In a centrifugal friction clutch, the combination of a driven member, a driver and a shoe, said shoe and driver having therebetween flexible connecting means located in the direction of the tangential force exerted on the shoe by the driver and connected and cooperating therewith and effective to exert pull on the front end of the shoe toward the center of the clutch thereby to lessen the pressure of the front end of the shoe on the driven member.

3. In a centrifugal friction clutch, the combination of a driven member, a driver and a shoe, said shoe and driver having therebetween flexible connecting means located in the direction of the tangential force exerted on the shoe by the driver and so arranged that the direction of the driving thrust cuts an axial plane through the center of gravity of the shoe in or outside of the friction track, whereby the contact pressure of the shoe on the driven member at the front end of the shoe in the direction of movement thereof is lessened.

4. In a centrifugal friction clutch, the combination of a driven member, a driver and a shoe, said shoe and driver having therebetween flexible connecting means located in the direction of the tangential force exerted on the shoe by the driver and fixed to the driver and co-operating with the shoe and so located as to lessen the contact pressure of the shoe on the driven member at the front end of the shoe in the direction of the movement thereof.

5. In a centrifugal friction clutch, the combination of a driven member, a driver and a shoe, said shoe and driver having therebetween flexible connecting means located in the direction of the tangential force exerted on the shoe by the driver and fixed to the driver and to the shoe and so located as to lessen the contact pressure of the shoe on the driven member at the front end of the shoe in the direction of movement thereof.

6. In a centrifugal friction clutch, the combination of a driven member, a radially-located driver pin and a shoe, said shoe and driver pin having means comprising a flexible connection fixed to the driver pin and co-operating with the shoe and so located as to lessen the contact pressure of the shoe on the driven member at the front end of the shoe in the direction of movement thereof.

7. In a centrifugal friction clutch, the combination of a driven member, a radially-located driver pin and a shoe, said shoe and driver pin having means comprising a flexible connection fixed to the driver pin and to the shoe and so located as to lessen the contact pressure of the shoe on the driven member at the front end of the shoe in the direction of movement thereof.

8. In a centrifugal friction clutch, the combination of a driven member, a driver and a shoe, said shoe and driver having therebetween flexible connecting means located in the direction of the tangential force exerted on the shoe by the driver and comprising a spring co-operating with the driver and shoe and so located as to lessen the contact pressure of the shoe on the driven member at the front end of the shoe in the direction of movement thereof.

9. In a centrifugal friction clutch, the combination of a driven member, a driver and a shoe, said shoe and driver having therebetween flexible connecting means located in the direction of the tangential force exerted on the shoe by the driver and comprising a spring fixed to the driver and co-operating with the shoe and so located as to lessen the contact pressure of the shoe on the driven member at the front end of the shoe in the direction of movement thereof.

10. In a centrifugal friction clutch, the combination of a driven member, a driver and a shoe, said shoe and driver having therebetween flexible connecting means located in the direction of the tangential force exerted on the shoe by the driver and comprising a spring fixed to the driver and to the shoe and so located as to lessen the contact pressure of the shoe on the driven member at the front end of the shoe in the direction of movement thereof.

11. In a centrifugal friction clutch, the combination of a driven member, a radially-located driver pin and a shoe and flexible means comprising a spring connecting the driver pin and the shoe and so located as to exert a pull on the front end of the shoe toward the center of the clutch thereby to lessen the contact pressure of the shoe on the driven member at the front end of the shoe in the direction of movement thereof.

12. In a centrifugal friction clutch, the combination of a driven member, a driver, and a shoe, said shoe and driver having flexible connecting means located between the planes of the ends of the shoe to lessen the contact pressure of the shoe on the driven member at the front end of the shoe in the direction of the tangential movement thereof.

13. In a centrifugal friction clutch, the combination of a driven member, a driver, and a shoe, said shoe and driver having flexible connecting means connected with the shoe between the planes of the ends thereof and so located as to lessen the contact pressure of the shoe on the driven member at the front end of the shoe in the direction of the tangential movement thereof.

14. In a centrifugal friction clutch, the combination of a driven member, a radially-located driving pin, and a shoe, said shoe and pin having flexible connecting means connected with the shoe between the planes of the ends thereof and so located as to lessen the contact pressure of the shoe on the driven member at the front end of the shoe in the direction of the tangential movement thereof.

In testimony wherof I have affixed my signature.

KARL JOHAN WERSÄLL.